United States Patent [19]

Fabiano et al.

[11] Patent Number: 4,993,593
[45] Date of Patent: Feb. 19, 1991

[54] APPARATUS AND METHODS FOR DISPENSING A FLOWABLE MEDIUM

[76] Inventors: Ralph Fabiano, 161 Edgar St., Weehawken, N.J. 07087; Fortunato Colacino, 29 Crystal St., North Arlington, N.J. 07032

[21] Appl. No.: 384,285
[22] Filed: Jul. 21, 1989
[51] Int. Cl.⁵ ............................................ B67D 5/62
[52] U.S. Cl. .................................. 222/1; 99/348; 219/442; 219/360; 222/54; 222/64; 222/105; 222/183; 222/146.5; 222/235; 222/443; 222/450; 366/142; 366/145; 366/147; 416/95
[58] Field of Search .................... 222/1, 54, 64, 105, 222/131, 183, 146.5, 233–235, 238, 239, 443, 450–452; 219/372, 441, 442, 523; 366/142, 145, 147; 99/348; 416/37, 95; 415/47; 251/5–9

[56] References Cited

U.S. PATENT DOCUMENTS

| | | | |
|---|---|---|---|
| 449,404 | 3/1891 | Dewey | 219/372 |
| 684,459 | 10/1901 | Porter | 219/372 |
| 961,628 | 6/1910 | Martin et al. | 222/235 |
| 1,430,935 | 10/1922 | Bright | 222/235 |
| 1,479,494 | 1/1924 | Beck | 219/372 |
| 1,587,840 | 6/1926 | Kilmer | 366/147 |
| 1,692,270 | 11/1928 | Jensen | 219/372 X |
| 1,857,734 | 5/1932 | Moldovan et al. | 222/451 X |
| 1,953,766 | 4/1934 | McMath et al. | 366/145 X |
| 2,175,912 | 10/1939 | Petrich | 416/95 |
| 2,494,625 | 1/1950 | Martin | 416/95 X |
| 2,540,472 | 2/1951 | Boyd et al. | 416/95 X |
| 2,673,011 | 3/1954 | Rood et al. | 222/450 X |
| 2,681,751 | 6/1954 | Stone et al. | 222/504 X |
| 2,718,985 | 9/1955 | Tamminga | 222/131 |
| 2,815,887 | 12/1957 | Ford et al. | 222/105 |
| 2,895,653 | 7/1959 | Giepen | 222/452 |
| 2,973,188 | 2/1961 | Howe | 416/81 |
| 3,020,025 | 2/1962 | O'Mara | 366/147 X |
| 3,042,265 | 7/1962 | Rodth | 222/146.5 |
| 3,105,616 | 10/1963 | Krup | 222/146.5 X |
| 3,143,768 | 8/1964 | Scherping | 366/289 X |
| 3,146,691 | 9/1964 | Martin | 99/348 X |
| 3,314,660 | 4/1967 | Arbiter | 366/142 X |
| 3,467,151 | 9/1969 | Vogt | 222/450 X |
| 3,550,814 | 12/1970 | von Lersner | 222/444 X |
| 3,586,819 | 6/1971 | Cairelli | 99/348 X |
| 3,589,834 | 6/1971 | Cairelli | 219/372 X |
| 3,635,147 | 1/1972 | Lee | 366/147 X |
| 3,650,201 | 3/1972 | Jovanovic | 99/279 |
| 3,741,439 | 6/1973 | Vehrs | 222/214 X |
| 3,766,845 | 10/1973 | Amstad | 99/324 |
| 3,838,680 | 10/1974 | Shipman | 126/373 |
| 3,876,121 | 4/1975 | Preikschat | 222/504 |
| 3,885,769 | 5/1975 | Morrison | 222/504 |
| 3,945,534 | 3/1976 | Ady | 222/105 |
| 4,032,045 | 6/1977 | Epple | 222/146.5 |
| 4,066,107 | 1/1978 | Karp et al. | 222/450 X |
| 4,174,789 | 11/1979 | West | 222/333 X |
| 4,176,766 | 12/1979 | West | 222/238 |
| 4,189,071 | 2/1980 | West | 222/238 |
| 4,252,254 | 2/1981 | Pryor | 222/67 |
| 4,264,020 | 4/1981 | Loiseau | 222/452 X |
| 4,266,697 | 5/1981 | Zissimopoulos | 222/450 |
| 4,286,910 | 9/1981 | Conrad | 222/450 X |
| 4,319,629 | 3/1982 | Hotta | 165/47 |
| 4,328,539 | 5/1982 | Heeger | 364/144 |
| 4,358,029 | 11/1982 | Yomoda | 222/133 |
| 4,361,176 | 11/1982 | West | 222/146.5 |
| 4,388,182 | 6/1983 | Hudson | 251/7 X |
| 4,395,133 | 7/1983 | Clevenholm et al. | 99/348 X |
| 4,450,758 | 5/1984 | Belinkoff et al. | 99/348 X |
| 4,565,304 | 1/1986 | Dronet | 222/450 X |
| 4,623,008 | 11/1986 | Shibata et al. | 222/52 X |
| 4,649,810 | 3/1987 | Wong | 99/348 X |
| 4,658,989 | 4/1987 | Bonerb | 222/105 |

FOREIGN PATENT DOCUMENTS 2606189  5/1988  France .................................. 222/450

*Primary Examiner*—Kevin P. Shaver
*Attorney, Agent, or Firm*—Ralph W. Selitto, Jr.

[57] ABSTRACT

A flowable medium, such as a liquid, a semi-liquid, or a liquid containing particulate matter, can be automatically dispensed in a premeasured amount or in a continuous stream. When the flowable medium is being dispensed in a premeasured amount, such amount is isolated from the remainder of the flowable medium during the dispensing operation so that it can be dispensed independently of any head pressure created by the remainder of the flowable medium. By using a temperature sensor in combination with a microcomputer system for the purpose of detecting large fluctuations in the temperature of the flowable medium, it is also possible to determine when the remainder of the flowable medium reaches a low level condition.

50 Claims, 10 Drawing Sheets

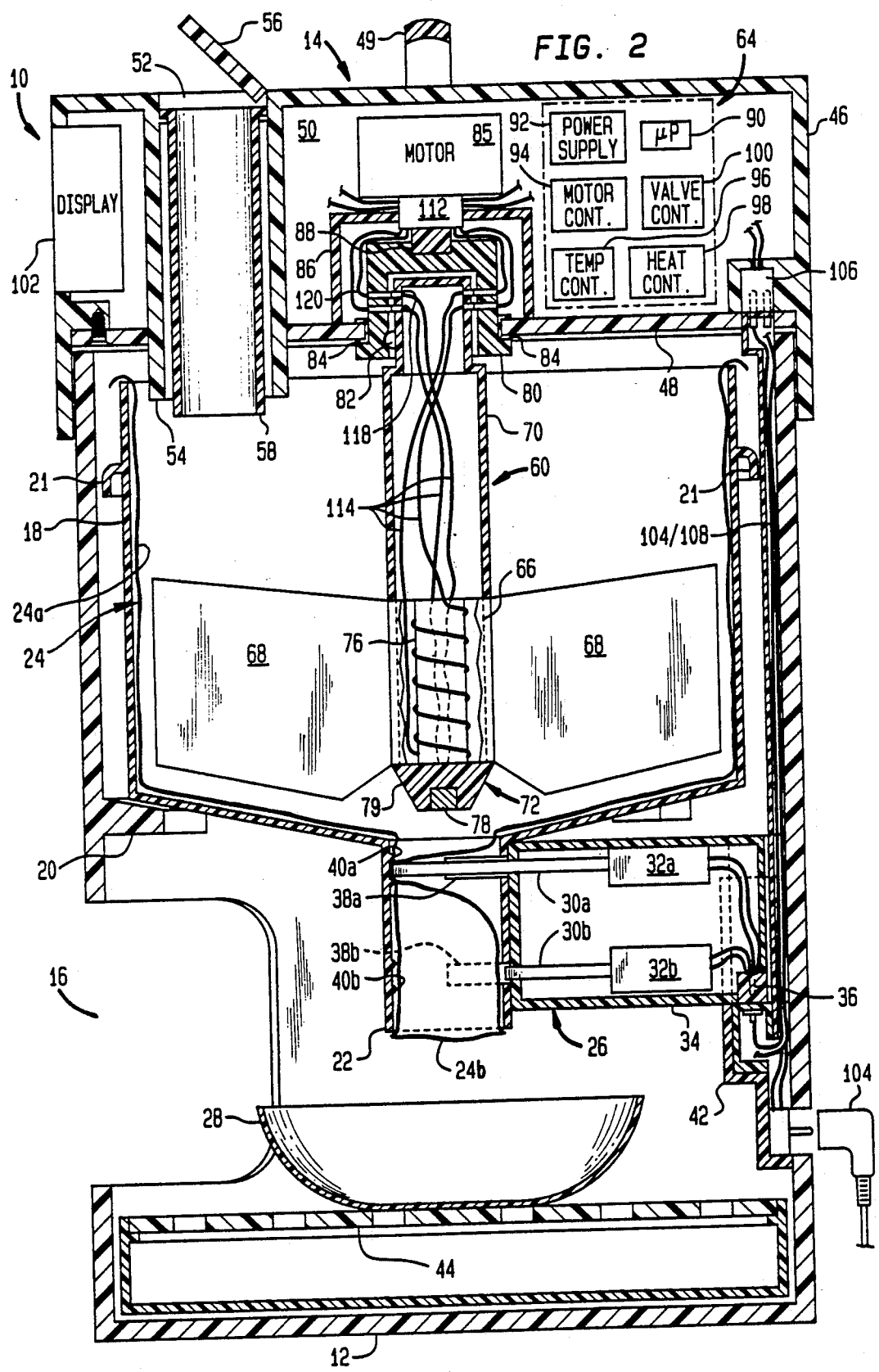

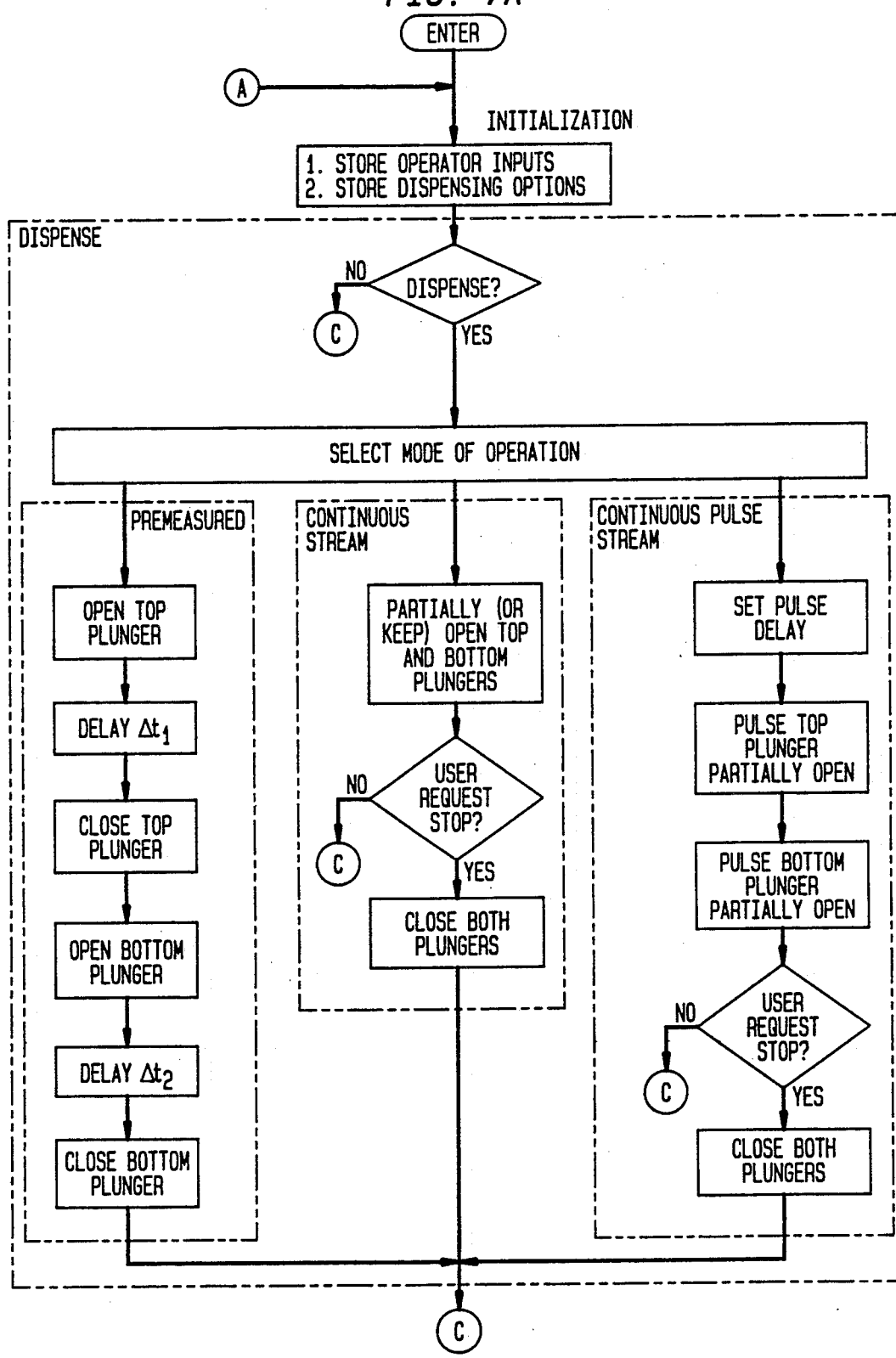

APPARATUS AND METHODS FOR DISPENSING A FLOWABLE MEDIUM

FIELD OF THE INVENTION

The present invention relates to apparatus methods for dispensing a flowable medium, and, more particularly, to such apparatus and methods for automatically heating, mixing and dispensing a premeasured amount or a continuous stream of a flowable medium.

BACKGROUND OF THE INVENTION

Apparatus for automatically dispensing flowable mediums are employed in a wide range of settings, ranging from kitchens to industrial facilities. Thus, a general purpose apparatus must be able to dispense a wide range of flowable mediums, including liquids, semi-liquids and liquids containing particulate matter. Preferably, the flowable medium should be dispensed automatically in a continuous, regulated stream.

A soup dispenser is a typical dispensing apparatus. In recent times, salad bars have gained in popularity in restaurants and fast-food chains due to the increasing number of health-conscious patrons who count their calories. Soup, laden with chunks of meat and vegetables, is a wholesome, nutritious item that is served in virtually every salad bar. To allow the patrons to help themselves, the soup is served from a soup dispenser.

One known type of soup dispenser includes a reservoir of soup that is gravity fed into a receptacle, such as a cup or bowl. The soup is discharged through an orifice in the reservoir and regulated by a valve. The discharge or flow rate in these gravity-feed systems is dependent upon the height of the soup (i.e., the "head") in the reservoir. This dependency causes problems in dispensing the soup. That is, because the height of the soup in the reservoir varies as the soup is dispensed, the rate of discharge also varies. As the height of the soup decreases, the resulting head pressure decreases which, in turn, decreases the rate of discharge. Thus, the soup is discharged at a continually decreasing rate, thereby making it difficult to dispense any one specific incremental amount with any degree of certainty. This head problem also causes an undesirable splattering effect, especially when high head pressures result in the soup being discharged very rapidly. Such splattering and sudden dumping resulting from high head pressures do not subside until the reservoir is partially emptied.

Many conventional soup dispensers have eliminated the head problem described above. The most basic of these conventional soup dispensers is a cauldron and ladle with the soup being withdrawn from the cauldron by the ladle. Although the soup is dispensed in premeasured portions without splattering, it is not dispensed automatically or in a continuous stream.

Improvements have been made to gravity-feed soup dispensers in the manner of dispensing premeasured amounts of soup by automatic means. For example, U.S. Pat. No. 4,032,045 discloses a soup dispenser having a volumetric trap valve journalled for rotation for removing soup in premeasured amounts from a reservoir. As the valve is aligned with an opening in the reservoir, soup flows into the trap. As the valve is further rotated, the soup is dispensed from the trap. Other similar soup dispensers are disclosed in U.S. Pat. Nos. 4,174,789; 4,176,766; 4,189,071; and 4,361,176, each of which operates to dispense a premeasured quantity of soup by selectively dispensing the soup into containers located within the dispenser and then emptying the contents of the selected containers into a receptacle. Although this type of dispenser has effectively eliminated irregular discharge caused by the head problem, such dispensers cannot provide a continuous discharge of the soup.

A number of additional problems are inherent with the conventional apparatus for dispensing soup. For example, sanitary problems abound because the cauldrons and reservoirs of many soup dispensers are open, thereby allowing dirt and other foreign matter to fall in. Cauldrons are also especially unsanitary in a communal setting when ladles contact other surfaces and are then placed therein.

Another problem arises from the method of heating the soup. The typical soup dispenser includes a heating element placed under the base of an open-faced reservoir. Since the heating element and hot base are exposed to the user, this arrangement is hazardous. Such open-faced reservoirs also loose heat through their open-faces. To compensate for the resulting heat loss, additional heat must be added. Not only does this waste energy, but it also has the unwanted effect of burning soup in the reservoir and evaporating the soup therein. When the soup is allowed to evaporate, water must be constantly added to the reservoir for the purpose of diluting the remaining soup.

SUMMARY OF THE INVENTION

The present invention relates to new and improved apparatus and methods for dispensing a flowable medium (e.g., a liquid, a semi-liquid or a liquid containing particulate matter) from a storage facility using a dispensing mechanism adaptable to dispense the flowable medium in either of two modes: premeasured or continuous stream. In accordance with the improvement, a first regulating mechanism regulates the flow of the flowable medium into the dispensing mechanism from the storage facility, the first regulating mechanism being movable between a first or closed position in which it prevents the flow of the flowable medium and a second or open position in which it permits the flow of the flowable medium. A second regulating mechanism is also employed for the purpose of regulating the flow of the flowable medium from the dispensing mechanism, the second regulating mechanism being movable between a first or closed position in which it prevents the flow of the flowable medium and a second or open position in which it permits the flow of the flowable medium. When operating in the premeasured mode the first and second regulating mechanisms are controlled such that the first regulating mechanism can be moved to its open position while the second regulating mechanism remains in its closed position, whereby the flowable medium can flow into the dispensing mechanism from the storage facility, and such that the second regulating mechanism can be moved from its closed position to its open position after the first regulating mechanism is moved from its open position to its closed position, whereby the flowable medium contained in the dispensing mechanism can be dispensed therefrom in a predetermined quantity independently of any head pressure created by the flowable medium stored in the storage facility. When operating in the continuous stream mode, the first and second regulating mechanisms are controlled such that the second regulating mechanism can be moved to its open position when the first regulating mechanism is in its open position, whereby the flowable medium can flow continuously to and from the dispensing mechanism.

To operate in a third mode (i.e., a continuous pulse stream mode), the first and second regulating mechanisms must be movable to positions intermediate their open and closed positions and in which they permit the flow of the flowable medium to and from the dispensing mechanism but at a flow rate less than that permitted when they are in their open positions. When operating in this mode, the first and second regulating mechanisms are controlled such that the first regulating mechanism can be moved from its intermediate position to its open position and then returned to its intermediate position while the second regulating mechanism remains in its intermediate position, whereby the flowable medium can flow from the storage facility to the dispensing mechanism in a continuous pulsed manner which facilitates the passage of particulate matter contained in the flowable medium, and such that the second regulating mechanism can be moved from its intermediate position to its open position and then returned to its intermediate position while the first regulating mechanism remains in its intermediate position, whereby the flowable medium can flow from the dispensing mechanism in a continuous pulsed manner which facilitates the passage of particulate matter contained in the flowable medium.

In accordance with one embodiment of the invention, the apparatus includes a hopper for holding the flowable medium, a flexible liner encased in a rigid tube located beneath the hopper and formed monolithically therewith for draining the flowable medium therefrom, and a pair of plungers adapted to enter the rigid tube for the purpose of crimping the flexible liner against an inner wall of the tube. By selectively synchronizing the actuation and deactuation of the plungers, the flowable medium can be dispensed in any one of the three modes described above (i.e., premeasured, continuous stream or continuous pulse stream).

The dispensing apparatus also includes a unique agitating/heating assembly in which a heating element is centrally located and is thermally connected to a plurality of thermally conductive blades. The heating element heats the blades which, in turn, transfer heat to the flowable medium as they rotate. In addition to performing such a heating function, the blades also perform an agitation function which results in a homogeneous mixture of the flowable medium. Furthermore, the turbulence of the agitated medium prevents particulate matter from clogging the discharge tube.

A temperature sensor is also located on the lower end of the agitating/heating assembly in order to monitor the temperature and level of the flowable medium in the hopper. The sensor is positioned at a level indicative that the hopper has to be refilled with flowable medium.

A microcomputer system controls the operation of the plungers and the agitating/heating assembly. It also monitors the level of the flowable medium within the hopper by detecting large, instantaneous fluctuations in the temperature within the hopper as sensed by the temperature sensor. More particularly, once the hot, flowable medium recedes past the temperature sensor, the sensor measures the temperature of the cooler surrounding air. This instantaneous fluctuation triggers a low level indicator.

The hopper is lined with a disposable liner to maintain sanitary conditions. The flowable medium is sealed within the hopper, isolating it from the environment and further promoting the sanitary conditions.

To dispense the flowable medium in premeasured amounts, the plungers are actuated as follows. Starting from an initial position in which both plungers crimp the flexible liner, the upper plunger is first withdrawn from the rigid tube, thereby causing the liner in the discharge tube to fill with flowable medium. Next, the upper plunger is reinserted into the rigid tube until it crimps the liner, thereby trapping flowable medium between the two plungers. Next, the lower plunger is withdrawn from the rigid tube, whereupon the trapped fluid is dispensed. Finally, the lower plunger is reinserted into the rigid tube, thereby returning to its initial or "home" position.

To dispense the flowable medium in a continuous stream, both plungers are partially or fully retracted from the discharge tube. Upon the receipt of a request issued by the user to stop dispensing, both plungers are fully extended.

To dispense the flowable medium in a continuous pulse stream, the plungers are operated in an alternating sequence. Cyclically, the upper plunger is partially retracted and then fully retracted and then partially retracted. When the upper plunger is fully retracted, the lower plunger is partially retracted; when the upper plunger is partially retracted, the lower plunger is fully retracted. The period of each cycle is adjustable. In this mode, each plunger is fully retracted for a relatively short period of time to allow large solids to pass through the liner, thereby preventing clogging.

In a second embodiment of the present invention, two disposable liners are employed: one for the hopper and another for the discharge tube. To accommodate the liners, the hopper and the discharge tube comprise separate pieces that are threadedly engaged by locking rings. Thus, to maintain sanitary conditions, the hopper must be disassembled and cleaned periodically, and the disposable liner must be replaced. This embodiment conveniently allows for the diameter of the discharge tube to be varied.

In a third embodiment of the present invention, the flowable medium is "prepackaged" in a disposable liner and dispensed therefrom by the dispensing apparatus. The disposable liner is made from a flexible membrane that is contoured to the shape of the hopper and discharge tube, thus resembling a "bag" having an udder-like valve section depending from an upper bag-portion. Both the top of the bag-portion and the tip of the valve section are sealed by a heat seal. Therefore, to dispense the flowable medium, the disposable liner is inserted into the dispensing apparatus with the valve section being inserted into the discharge tube. After the top seal is broken, the open upper end of the liner is draped over the side of the hopper to allow the agitating/heating element to be inserted into the bag-portion. The seal at the tip of the valve section can then be broken to allow flowable medium to flow through.

BRIEF DESCRIPTION OF THE DRAWINGS

For a better understanding of the present invention, reference is made to the following description of various exemplary embodiments considered in conjunction with the accompanying drawings, in which:

FIG. 2 is a vertical cross-sectional view of the dispensing apparatus illustrated in FIG. 1;

FIGS. 7A and 7B constitute a flow chart of the system control program for the dispensing apparatus illustrated in FIG. 1;

DETAILED DESCRIPTION OF THE EXEMPLARY EMBODIMENTS

While the present invention may be used to dispense any flowable medium, such as a liquid, semi-liquid or liquid containing particulate matter, it is especially useful in connection with storing and dispensing liquid or semi-liquid food products such as soup. Accordingly, in the following discussion, the present invention will be described with reference to a soup dispenser.

Figure 1:
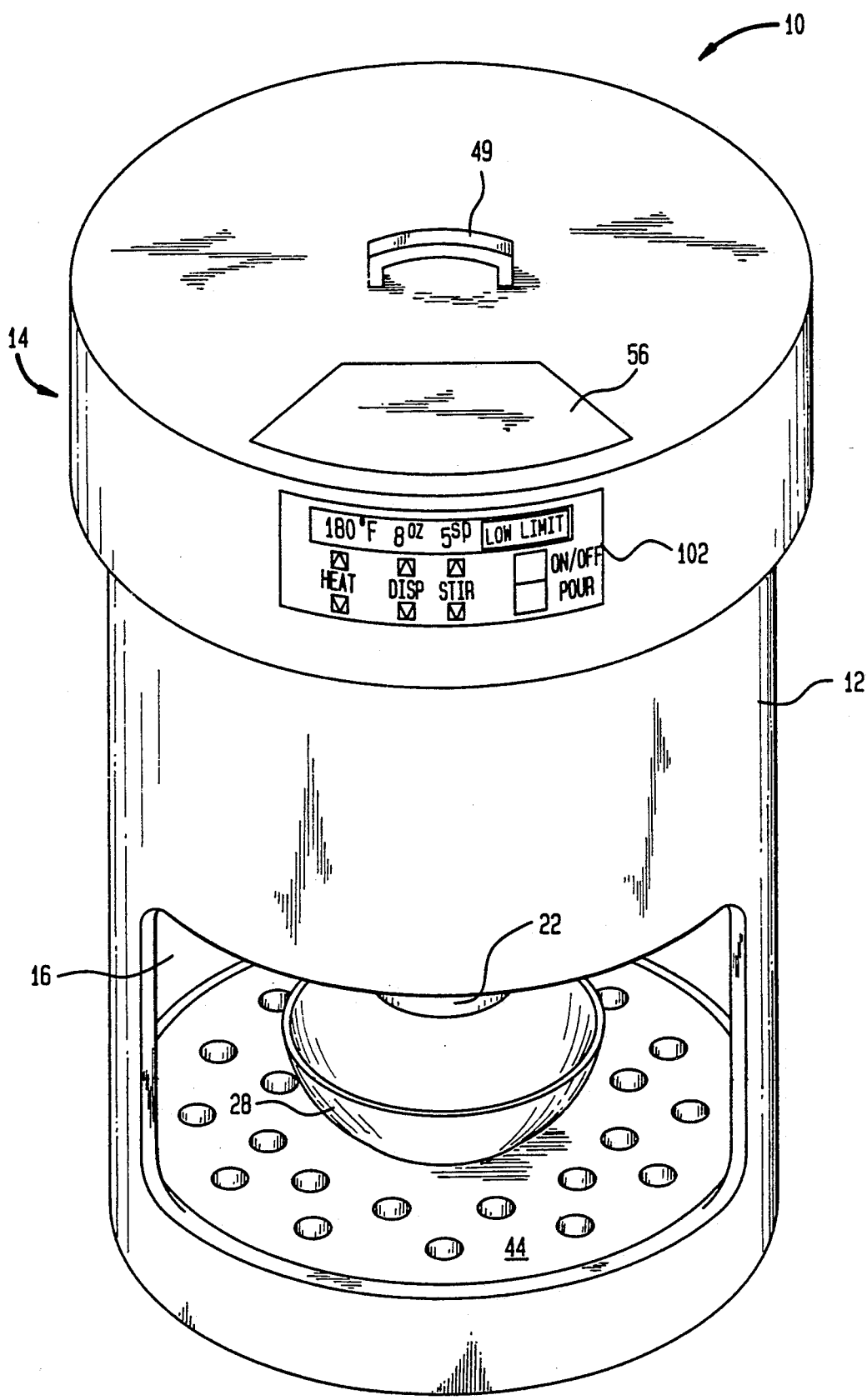
FIG. 1 is a perspective view of a dispensing apparatus constructed in accordance with one embodiment of the present invention.

Referring now to FIGS. 1 and 2, there is shown a soup dispenser 10 having an outer shell 12 and a control head enclosure 14. The outer shell 12 functions as a primary support structure, a protective cover and a thermal insulator for the soup dispenser 10. The outer shell 12 is a cylindrical sleeve disposed in an upright position having an open end and an opposing closed end adapted to form the base of the soup dispenser 10. A rectangular access window 16 cutting through the outer shell 12 is located near the base of the outer shell 12. The function of the access window 16 will be discussed hereinafter. The outer shell 12 is made of a material, such as plastic, that is durable and washable, and possesses good qualities as a thermal insulator. The exterior surface of the outer shell 12 can be adapted to fit the decor of the facility (e.g., restaurant, house, etc.) in which the soup dispenser 10 is being used.

The outer shell 12 houses a funnel-shaped hopper 18 which functions as a reservoir for the flowable medium. The funnel shape facilitates the discharge of particulate matter from the hopper 18. The hopper 18 rests atop stops 20 which project radially into the interior of the outer shell 12. Diametrically-opposed handles 21 extend outwardly from opposite sides of the hopper 18. Thus, the hopper 18 can be withdrawn by the handles 21 from the top of the outer shell 12 for cleaning. A discharge tube 22 extends downwardly from the bottom of the hopper 18. The hopper 18 and discharge tube 22 are also constructed of a durable, washable material such as plastic. In this embodiment of the present invention, the discharge tube 22 is formed monolithically with the hopper 18.

A disposable liner 24 is removably disposed within the hopper 18 and discharge tube 22. A single, flexible, thin-walled membrane, the disposable liner 24 includes a bag-portion 24a contoured to the shape of the hopper 18 and a valve section 24b contoured to the shape of the discharge tube 22. The disposable liner 24 is secured to the hopper 18 by draping the bag portion 24a over the top of the hopper 18 and attaching or fastening it thereto by any suitable means such as clips or bands. The valve section 24b extends into and through the discharge tube 22. As will be described hereinafter, the valve section 24b forms an integral part of the system that dispenses a premeasured quantity or continuous flow of the flowable medium from the hopper 18. Furthermore, periodic replacement of the disposable liner 24 keeps the hopper 18 sanitary.

Figure 3A:
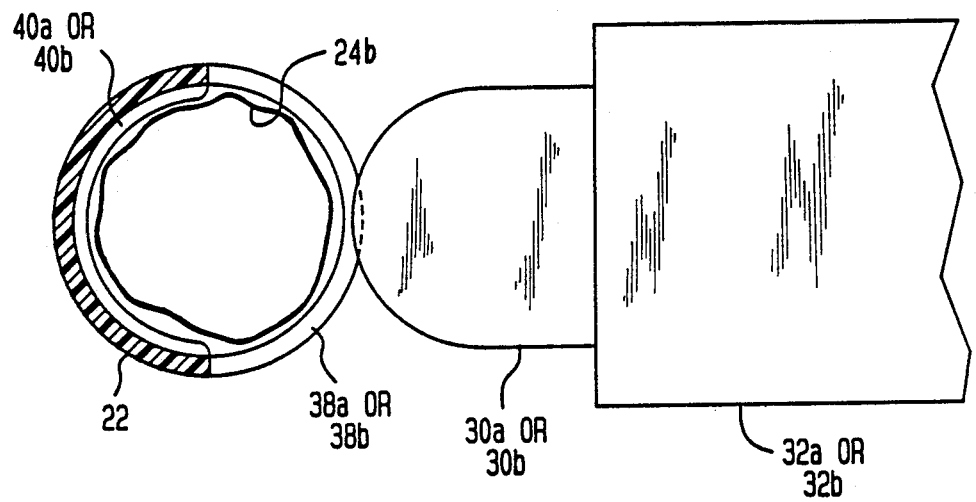
FIG. 3A is a schematic illustration of a plunger shown in a retracted position.
Figure 3B:
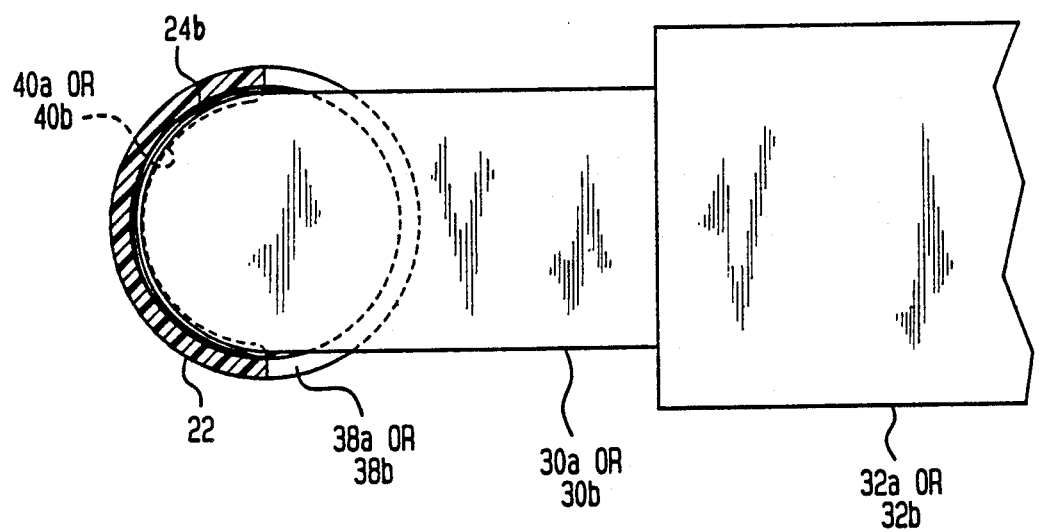
FIG. 3B is a schematic illustration of the plunger of FIG. 3A after it has been moved to an extended position.

A valve assembly 26 cooperates with the discharge tube 22 to dispense flowable medium from the hopper 18. The valve assembly 26 includes upper and lower plungers 30a and 30b, corresponding valve actuators 32a and 32b, a valve actuator housing 34 and a first electrical connector 36. The discharge tube 22 is provided with upper and lower slots 38a and 38b which are sized and shaped to receive the corresponding plungers 30a and 30b, respectively, such that each plunger 30a and 30b slides from a retracted position in which it is completely external to the discharge tube 22 (see FIG. 3A) to an extended position in which the discharge tube 22 is completely blocked (see FIG. 3B). In the extended position, the plunger 30a or 30b pinches the valve section 24b of the disposable liner 24 against the side wall of the discharge tube 22 to thereby completely block the flow of flowable medium. To assist in blocking the flow of flowable medium, each slot 38a and 38b in the discharge tube 22 is provided with an arcuate seat 40a and 40b respectively, adapted to receive the plunger 30a or 30b, respectively, when moved to its extended position. In an intermediate position, the plunger 30a or 30b reduces the diameter of the valve section 24b, thereby restricting, but not blocking, the flow of flowable medium therethrough.

Each valve actuator 32a and 32b slides its corresponding plunger 30a and 30b between the retracted and extended positions. If the plungers 30a and 30b are to be operated between an infinitely variable number of intermediate positions, the valve actuators 32a and 32b can be linear motors or rack and pinion assemblies. If the plungers 30a and 30b are to be operated between two positions only (retracted and extended), the valve actuators 32a and 32b can be solenoids or equivalent devices. However, since solenoid-type actuators do not operate in intermediate positions, the number of available modes for dispensing the flowable medium is limited when such actuators are employed. As will be seen, certain modes require intermediate positions for the plungers 30a and 30b.

Figure 4:
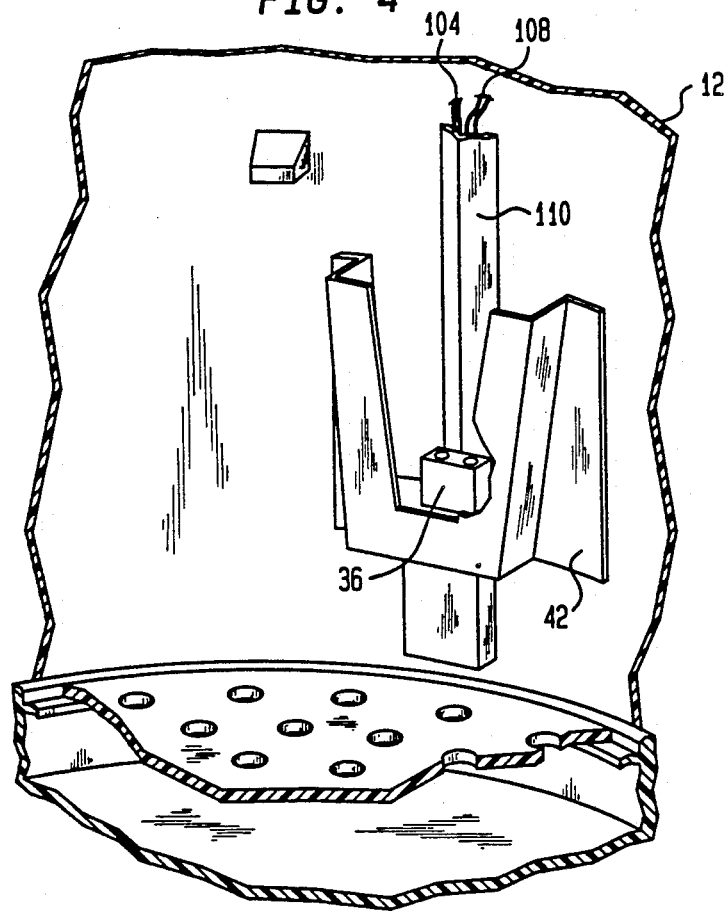
FIG. 4 is a detailed view of a hanger and electrical connector for a valve assembly forming a part of the dispensing apparatus illustrated in FIG. 1, the valve assembly having been removed for clarity.

The valve actuators 32a and 32b are contained within a valve actuator housing 34 and are electrically connected to the male half of a first electrical connector 36, which is attached to the exterior of the valve actuator housing 34. The valve actuator housing 34 is removably attached to the outer shell 12 by a hanger 42 (see FIG. 4 for greater detail). The hanger 42 includes the female half of the first electrical connector 36 which mates with the male half when the valve actuator housing 34 is properly mounted. Thus, when the valve assembly 26 is mounted to the outer shell 12, one end of the valve actuator housing 34 is removably attached to the hanger 42 and the opposite end of the valve actuator housing 34 is detachably fastened to the discharge tube 22 such that the plungers 30a and 30b can slide freely within the slots 38a and 38b between the extended and retracted positions. When the valve actuator housing 34 is dismounted, the male and female halves of the first electrical connector 36 are separated, thereby electrically disconnecting the valve actuators 32a and 32b. This safety feature prevents electrical shock and unwarranted operation of the plungers 30a and 30b while cleaning or servicing the soup dispenser 10.

A removable drip tray 44 is positioned below the hopper 18 by inserting it through the access window 16 of the outer shell 12 and resting it atop the base. A receptacle 28, such as a cup or bowl, is inserted through the access window 16, placed atop the drip tray 44 and positioned beneath the discharge tube 22 in order to receive the flowable medium. The drip tray 44 has a perforated upper surface which allows spillage from the receptacle 28 to pass therethrough and be collected within the drip tray 44.

The control head enclosure 14 functions partly as a cover for the soup dispenser 10. The control head enclosure 14 includes a cap 46 and a baseplate 48. The cap 46 is a short sleeve having a closed end and an open end. A handle 49 for grasping the control head enclosure 14 is located atop the closed end of the cap 46. The baseplate 48 is attached to the midsection of the cap 46 to form a compartment 50 therebetween. The cap 46 and baseplate 48 are sealed in a waterproof manner. The control head enclosure 14 is mounted to the outer shell 12 by slipping the cap 46 thereover until the baseplate 48 abuts against the top of the outer shell 12.

Because the hopper 18 is sealed, a refill exit port 52, which is an aperture in the cap 46 of the control head enclosure 14, is provided to permit the supply of the flowable medium to be replenished without having to remove the control head enclosure 14. A sleeve 54 aligned with the refill exit port 52 and an aperture in the baseplate 48 (not shown) is attached to the cap 46 and baseplate 48, thereby forming a passageway to the hopper 18. A refill lid 56, hingedly attached to the cap 46 covers the refill exit port 52. A thin-walled collar 58 surrounds the sleeve 54 to make for easy cleaning Thus, flowable medium can be poured through the refill exit port 52 and down the sleeve 54.

In addition to functioning as a cover for the outer shell 12, the control head enclosure 14 provides a mount for an agitating/heating assembly 60. It also houses control electronics 64 in the compartment 50. To dissipate heat generated by the control electronics 64, the compartment 50 is provided with vents (not shown).

The agitating/heating assembly 60 includes a collar 66 that is formed monolithically with a plurality of radially extending blades 68. The collar 66 and blades 68 are constructed from a thermally conductive material in order to provide even heat distribution to the flowable medium. Furthermore, rotation of the blades 68 agitates particulate matter within the flowable medium, thereby preventing the particulate matter from settling to the bottom of the hopper 18 and clogging the discharge tube 22. Agitation also has the desirable effect of creating a homogeneous mixture within the hopper 18, thereby ensuring a homogeneous mixture upon discharge.

Figure 5:
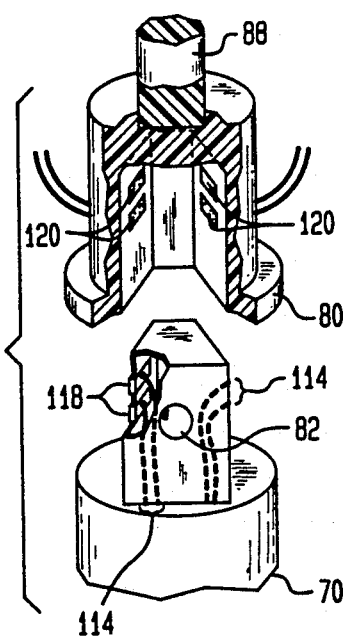
FIG. 5 is an exploded view of a quick mount mechanism forming a part of the dispensing apparatus illustrated in FIG. 1.

An agitator shaft 70 is constructed from a thermally non-conductive material such as plastic. The conductive collar 66 rigidly attaches to one end of the agitator shaft 70 in order to prevent heat from being transferred from the conductive collar 66 to the control head enclosure 14. The thermally non-conductive agitator shaft 70 also provides a safe area to grasp the agitating/heating assembly 60 when removing it from control head enclosure 14. The opposite end of the agitator shaft 70 terminates in a polygonal shape (see FIG. 5).

A heating cartridge 72, including a heating element 76 and temperature sensor 78, is inserted into the conductive collar 66 in such a manner that the agitating/heating assembly 60 becomes a unitary structure which is both sealed and watertight. Thus, the entire agitating/heating assembly 60 must be replaced every time a part thereof becomes defective. The heating element 76 makes thermal contact with the conductive collar 66, thereby heating the collar 66 and blades 68 when operative. The exposed surface of the blades 68 enhances the transfer of heat to the flowable medium. Rotation of the blades 68 further enhances the heat transfer. The heating element 76 is typically an electrical high-resistance coil that generates heat in proportion to the current passing through it. Thus, the amount of heat can be controlled by regulating the current passing through the heating element 76.

The temperature sensor 78, located at the tip of the conductive collar 66, senses the temperature in the hopper 18. The temperature sensor 78 is typically a thermistor whose resistance is proportional to the ambient temperature. Thus, by determining the resistance of the thermistor, the temperature within the hopper 18 is obtained. Thermal insulating material 79, such as the material used for the agitator shaft 70, prevents heat generated by the heating element 76 and conducted by the conductive collar 66 from damaging the temperature sensor 78. The thermal insulating material 79 also seals the conductive collar 66 in a watertight manner, thereby preventing the flowable medium from contacting the heating element 76. The temperature sensor 78 is located at a position within the hopper 18 indicative of a low level mark. The significance of the location will become apparent with a description of the low level detection.

The agitating/heating assembly 60 is rotatably and detachably mounted to the control head enclosure 14 by a "quick-mount" mechanism 80. The quick-mount mechanism 80 has a bell shape with a cavity that receives the polygonally-shaped end of the agitator shaft 70 such that the agitator shaft 70 and quick-mount mechanism 80 rotate conjointly (see FIG. 5). A spring-loaded bearing 82 located in the agitator shaft 70 cooperates with a pocket (not shown) in the quick-mount mechanism 80 to prevent the agitator shaft 70 from moving vertically and slipping out of the quick-mount mechanism 80. The quick-mount mechanism 80 extends through the baseplate 48 and is rotatably mounted thereto as will be described hereinafter. To reduce friction and to allow for free rotation, a Teflon collar 84 is positioned between the quick-mount mechanism 80 and baseplate 48. To remove the agitating/heating assembly 60 from the control head enclosure 14 for servicing and/or cleaning, the agitator shaft 70 is forcibly withdrawn from the quick-mount mechanism 80.

The agitating/heating assembly 60 is rotated by a variable speed motor 85 which can be either an AC or DC type. The speed of the motor is adjusted manually or automatically to adapt the agitating/heating assembly 60 to any medium. The motor 85 is attached to the baseplate 48 of the control head enclosure 14 by motor mounts 86, which can be fixedly attached to the baseplate 48 or formed integrally therewith. The motor 85 has a shaft 88 which is rigidly connected to the quick mount mechanism 80. Thus, as the shaft 88 rotates, the quick mount mechanism 80 and the agitating/heating assembly 60 rotate with it. Furthermore, by rigidly connecting the quick mount mechanism 80 to the shaft 88, the quick mount mechanism 80 cannot move vertically. Thus, the quick mount mechanism 80 remains in constant communication with the baseplate 48.

In an alternate embodiment, not shown, a motor rotates the quick mount mechanism indirectly, using a belt and two pulleys. One pulley is rigidly attached to the shaft of the motor; the other pulley is rigidly attached to the quick mount mechanism. The belt is trained about the two pulleys to interconnect them.

The control electronics 64 include a microcomputer system 90 (which will be described in greater detail below), power supply 92, motor control 94, temperature control 96, heater control 98 and valve control 100. These control electronics 64 are conveniently located in the vented, but otherwise watertight, compartment 50 in the control head enclosure 14. Thus, the components are protected from splattered flowable medium that is being agitated in the hopper 18 by the agitating/heating assembly 60. Also housed by the control head enclosure 14 is the panel display/keypad 102, which is mounted externally on the surface of the cap 46.

Electricity is supplied to the soup dispenser 10 by a detachable power cord 104 adapted to be plugged into a 120 VAC outlet or any other common electrical source. The power cord 104 enters the base of the outer shell 12 on a side opposite the access window 16, and runs from the bottom of the outer shell 12 to the top of the outer shell 12, where it terminates in the female half of a second electrical connector 106. The corresponding male half is electrically connected to the power supply 92 and physically mounted to the baseplate 48 of the control head enclosure 14. The female half of the second electrical connector is directly connected to the power cord 104; otherwise, the exposed prongs on the male half could cause electrical shock.

The valve assembly 26 is electrically connected to the female half of a third electrical connector (not shown) via conductor 108. A plastic strip 110 covers conductors 104 and 108 (see FIG. 4). The female half of the third electrical connector is mounted on the outer shell 12 adjacent to the female half of the second electrical connector 106. The male half of the third electrical connector is electrically connected to the valve control 100 and physically mounted on the baseplate 48 adjacent to the male half of the second electrical connector 106.

The male and female halves of the second and third electrical connectors must be properly aligned in order to mate when the control head enclosure 14 is mounted atop the outer shell 12. In this configuration, the second and third connectors serve two functions. First, the mated connectors function as a key to secure the control head enclosure 14 to the outer shell 12 in its proper position. Second, the second and third connectors provide a safety function during servicing and maintenance of the soup dispenser 10. That is, whenever the control head enclosure 14 is removed from the outer shell 12, the second and third electrical connectors are separated, thereby disconnecting the power supply 92 and deactivating the soup dispenser 10. Thus, the blades 68 cannot be rotated, the heating element 76 cannot be activated, and the valve assembly 26 cannot be actuated.

The heating element 76 and temperature sensor 78 maintain continuous electrical contact with their respective control units. Conductors 114 located within the agitator shaft 70 electrically connect the heating element 76 and temperature sensor 78 to a first set of contacts 118 on the polygonally-shaped face of the agitator shaft 70 (see FIG. 5). A second set of contacts 120 located within the cavity of the quick-mount mechanism 80 makes contact with the first set of contacts 118 whenever the agitator shaft 70 and quick-mount mechanism 80 are engaged. This feature facilitates a fast electrical disconnection whenever the agitating/heating assembly 60 is dismounted from the control head enclosure 14. The second set of contacts 120 is, in turn, electrically connected to the heat control 98 and temperature control 96 through a slip ring assembly 112. The slip ring assembly 112, which allows for continuous electrical contact between rotating surfaces, is well known to those skilled in the art. Thus, while the agitating/heating assembly 60 rotates, a conducting path is continuously maintained by the slip ring assembly 112 between the heating element 76 and the heat control 98. Similarly, a conducting path is continuously maintained between the temperature sensor 78 and the temperature control 96.

Figure 6:
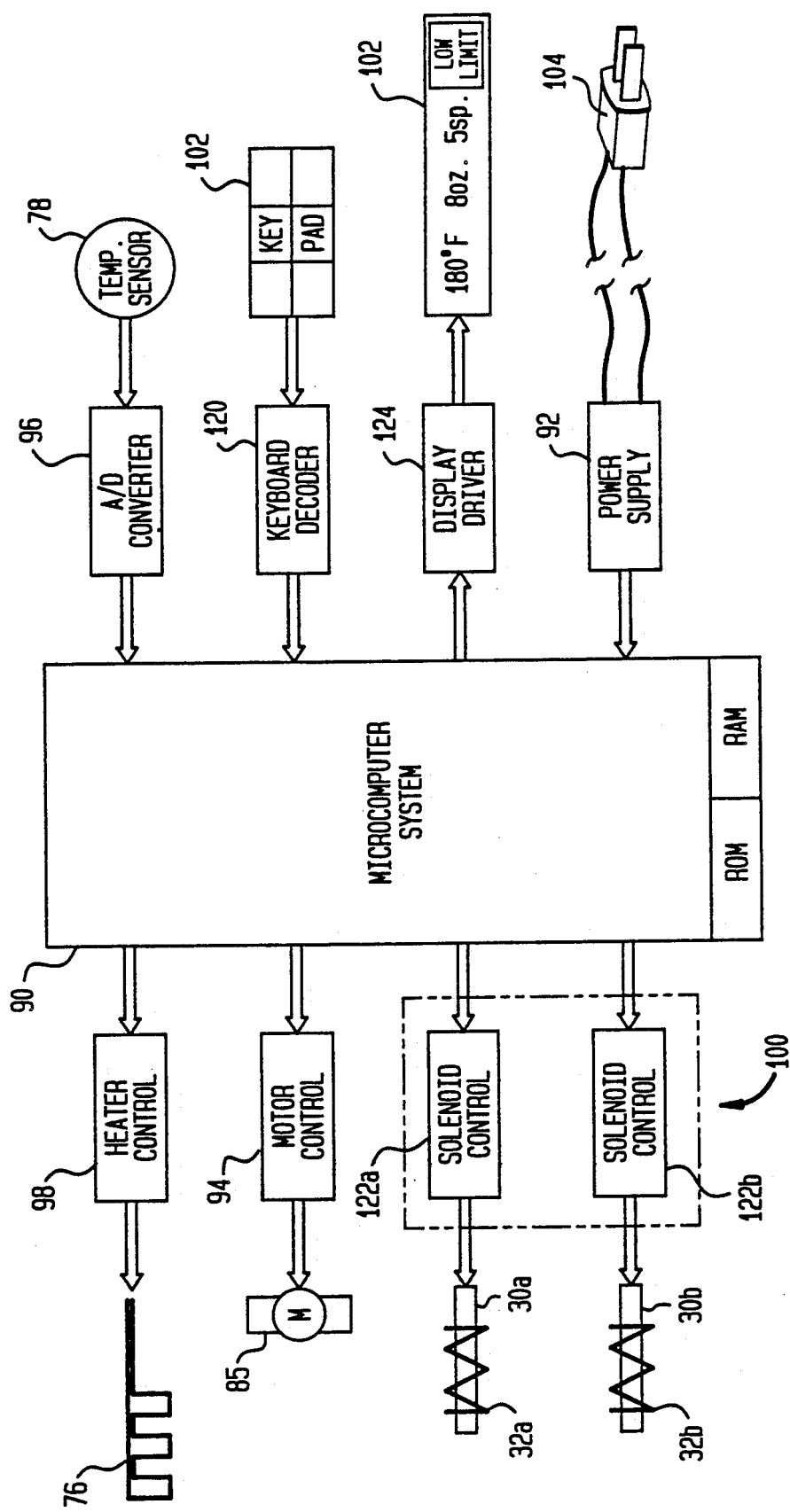
FIG. 6 is block diagram of the control electronics forming a part of the dispensing apparatus illustrated in FIG. 1.

Referring now to FIG. 6, the various automatic operations of the motor 85, temperature sensor 78, heating element 76 and valve assembly 26 are controlled by the microcomputer system 90. The microcomputer system 90 can include a single microprocessor unit for controlling the various operations, or it can include four dedicated processors, with each processor independently controlling a single operation. Each implementation offers its own advantages: a single processor is less expensive; but four dedicated processors can control the four operations simultaneously. The selection of a particular type of microcomputer system 90 is left to those skilled in the art. Furthermore, the general principles of construction of microprocessors are well known to those skilled in the art, and, apart from their specific application to provide the control called for by the present invention, are not described in detail herein.

The microcomputer system 90 also includes read-only memory (ROM) and random access memory (RAM). A system control program, which will be discussed in greater detail hereinafter, is stored in read-only memory ROM. Operator inputs from the display panel/keypad 102 are stored in random access memory RAM.

The keypad 102 enables an operator to select and "program" various functions of the soup dispenser 10, including heat, stir and dispense. Input signals from the keypad are digitally encoded by an encoder 120 and sent to random access memory RAM where they are stored for use by the system control program. The "programmable" functions of the soup dispenser 10 and the corresponding inputs to enable these functions will be discussed in connection with the system control program.

The power supply 92 receives 120 VAC from the power cord 104 and supplies power to the heating element 76, temperature sensor 78, motor 85, valve actuators 32a and 32b and control electronics 64 including the microcomputer system 90. Certain components (i.e. the microcomputer system 90) require DC power; therefore, the 120 VAC input must be stepped down, rectified and filtered. This function can be performed by a solid state voltage regulator which is well known to those skilled in the art. An ON/OFF switch located on the display panel/keypad 102 actuates the power supply 92, while a POUR button allows the flowable medium to be discharged by the valve assembly 26.

The motor control 94 regulates the speed of the motor 85 based upon a digital input from the microcomputer system 90. Thus, the motor control 94 must interpret the digital input and command the variable speed motor 85 accordingly. Such control circuits are well known to those skilled in the art. If a single speed motor is employed, the motor control can be a relay with the primary side connected to the microcomputer system 90 and the secondary side connected in series with the power supply 92 and motor 85.

The temperature control 96 converts the analog input from the temperature sensor 78 to a digital word that is output to the microcomputer system 90. An analog to digital (A/D) converter can be implemented to perform this function. Such A/D converters are well known to those skilled in the art.

The heater control 98 controls the current passing through the heating element 76 based upon a digital input from the microcomputer system 90. Thus, the heater control 98 must interpret the digital input and output the corresponding analog signal to the heating element 76. This function can be implemented in part by a digital to analog (D/A) converter which is known to those skilled in the art. If only one heat setting is required, this function can be implemented by a relay having its primary side connected to the microcomputer system 90 and its secondary side connected in series with the heating element 76 and the power supply 92.

The valve control 100 is only necessary to independently operate each valve actuator 32a and 32b when the digital signals from the microcomputer system 90 are not of sufficient power to do so. The type of valve control 100 employed depends upon the type of valve actuators 32a and 32b employed. For example, if the plungers 30a and 30b are to be operated between two positions by devices such as solenoids, the valve control 100 can be implemented by a pair of relays 122a and 122b, each corresponding to one valve actuator 32a or 32b. The primary side of the relay 122a or 122b is connected to the microcomputer system 90 and the secondary side is connected in series with the valve actuator 32a or 32b and the power supply 92. Thus, the microcomputer system 90 actuates the relay 122a or 122b which actuates the valve actuator 32a or 32b, thereby operating the plunger 30a or 30b. If the plungers 30a and 30b are to be operated between an infinitely variable number of positions by such means as a linear motor or rack and pinion, each position will depend upon the amplitude of the microprocessor signal Therefore, the valve control 100 would, in such a case, be in the form of a pair of amplifiers or equivalent devices.

The display panel/keypad 102 displays the desired temperature setting of the flowable medium in the hopper 18, the amount of flowable medium being dispensed, the motor speed and the flowable medium level in the hopper 18. These settings can be variably adjusted by the UP/DOWN arrows. For example, the display panel/keypad 102 illustrated in FIG. 1 indicates that soup dispenser 10 will heat the flowable medium in the hopper 18 to a temperature of 180 degrees (180), dispense eight ounces of flowable medium (8 oz) and agitate the flowable medium in the hopper 18 at a moderate speed (5 sp). Furthermore, the display panel/keyboard 102 indicates a low level of flowable medium in the hopper 18 if the lamp designated LOW LEVEL is illuminated. A display driver 124 interfaces between the microcomputer system 90 and display panel/keypad 102. Such drivers 124 are well known to those skilled in the art.

To operate the soup dispenser 10, an operator actuates the ON/OFF switch and selects the desired function from the display panel/keypad 102. Once the power is turned on, the microcomputer system 90 begins executing the system control program. Once the function is selected, the microcomputer system 90 responds in accordance with the system control program.

Figure 7B:
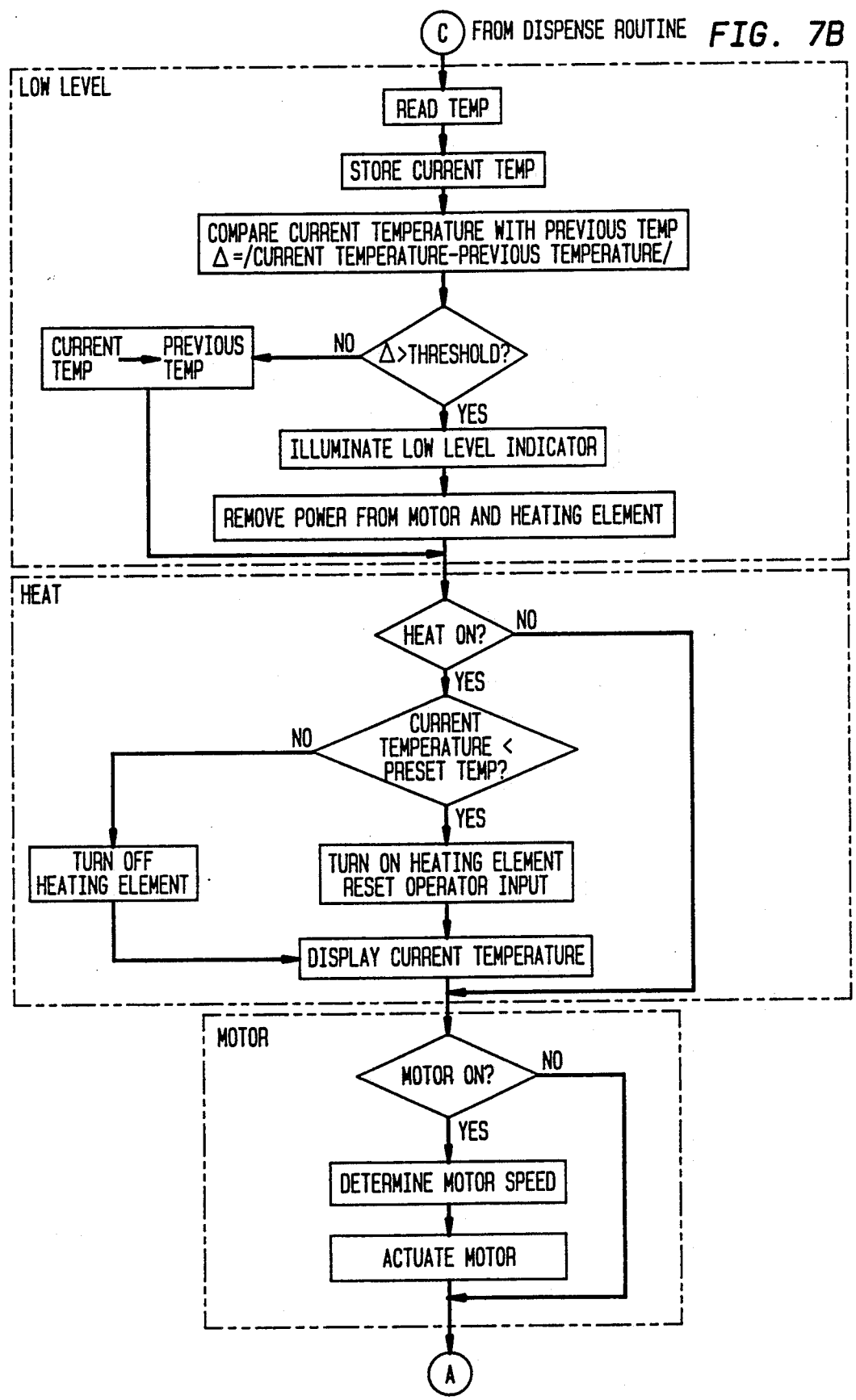

The system control program is illustrated in FIG. 7A and 7B. In addition to an INITIALIZATION routine, four main routines are executed DISPENSE, HEAT, MOTOR and LOW LEVEL. Depending upon the type of microcomputer system 90, the main routines can be executed sequentially or simultaneously. For example, if the microcomputer system 90 employs four dedicated processors, the main routines can be performed simultaneously. On the other hand, if a single microprocessor is employed, these routines would be executed in a fixed sequence The system control program illustrated in FIGS. 7A and 7B is written for a microcomputer system 90 employing a single microprocessor It should be noted, however, that each routine, without substantial change, can be readily adapted for use in a dedicated processor.

First, the microcomputer system 90 performs an INITIALIZATION routine by saving all current operator inputs from the decoder into RAM. These operator inputs include commands to heat, stir and dispense the flowable medium in the hopper 18. The microcomputer system 90 also stores the dispensing options in RAM. These options will be described hereinafter in connection with the DISPENSE routine.

Next, the microcomputer system 90 performs the DISPENSE routine to dispense the flowable medium. If the corresponding operator input indicates that the operator did not command the soup dispenser 10 to dispense the flowable medium, the microcomputer system 90 commands both plungers 30a and 30b to the extended position and jumps to the next routine. Otherwise, if the soup dispenser 10 is commanded to dispense the flowable medium, the microcomputer system 90 examines the dispense options to determine the mode for dispensing the flowable medium. Three modes are available: premeasured, continuous stream, and continuous pulse stream.

Figure 8A:
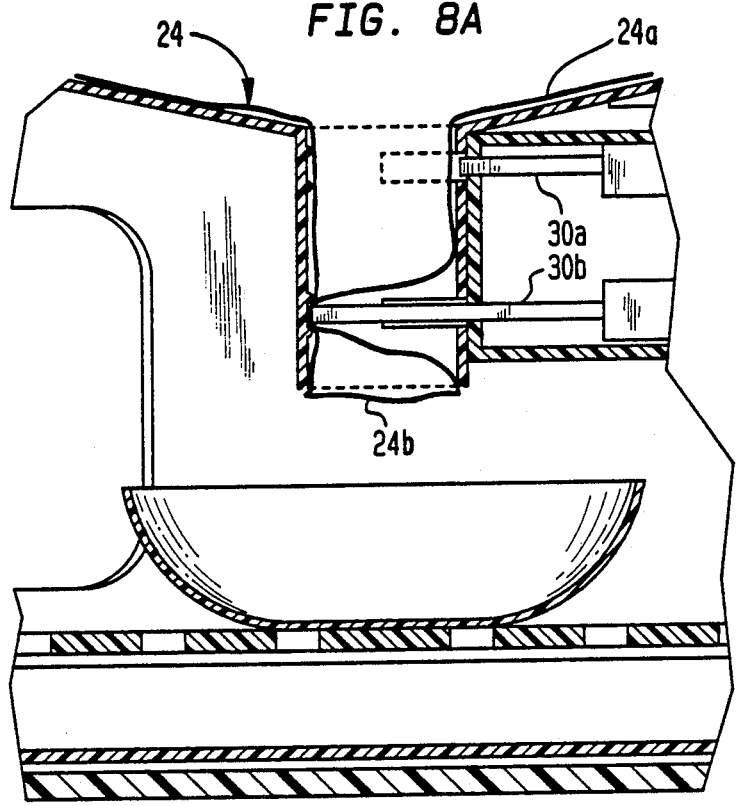
FIG. 8A is a detailed view of an actuator assembly shown in a measuring phase of a premeasured mode of operation.
Figure 8B:
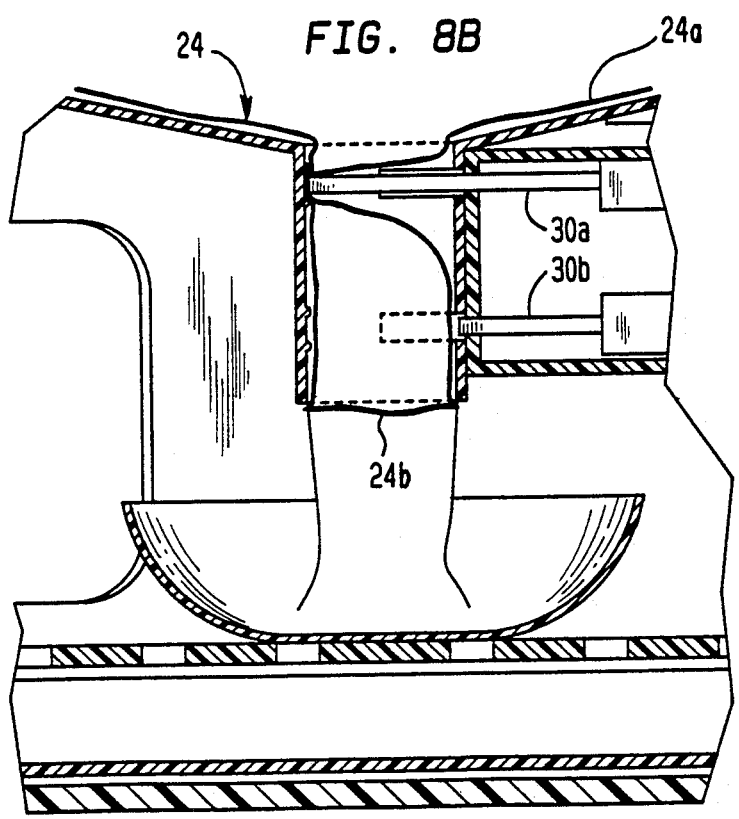
FIG. 8B is a detailed view of the actuator assembly of FIG. 8A, the actuator assembly being shown in a dispensing phase of the premeasured mode of operation.
Figure 8C:
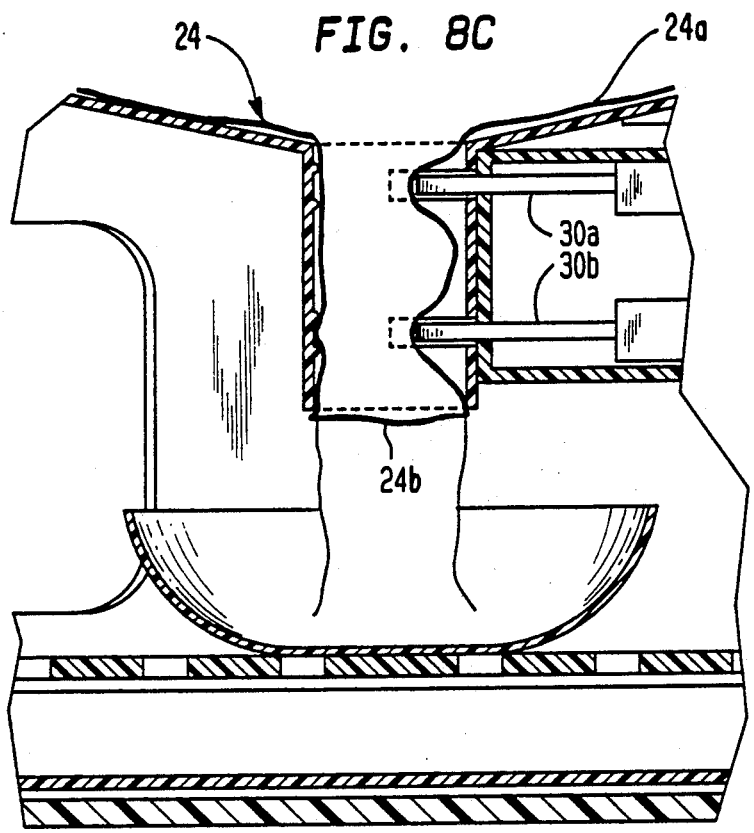
FIG. 8C is a detailed view of the actuator assembly of FIGS. 8A and 8B, the actuator assembly being shown in a continuous stream mode of operation.

If the premeasured mode is selected, the soup dispenser 10 dispenses a premeasured volume of the flowable medium. Starting from an initial position in which both plungers 30a and 30b are in their extended positions, the microcomputer system 90 commands the upper plunger 30a to its retracted position by actuating the corresponding valve actuator 32a. As the upper plunger 30a is slid to its retracted position, the flowable medium flows into the discharge tube 22. The flow stops at the lower plunger 30b, which, in its extended position, pinches the valve section 24b of the disposable liner 24. The plungers 30a and 30b are held in their respective positions for a predetermined delay time until the discharge tube 22 is filled, either completely or partially. This delay time depends, of course, upon the viscosity of the flowable medium and the extent to which the discharge tube 22 is to be filled. Once the discharge tube 22 has been filled to the desired extent, the microcomputer system 90 causes the upper plunger 30a to be moved to its fully extended position, thereby trapping the premeasured quantity of flowable medium between the upper and lower plungers 30a and 30b. As soon as the upper plunger 30a reaches its extended position, the lower plunger 30b is moved to its retracted position as shown in FIG. 8B, whereupon the trapped quantity of flowable medium is dispensed into the receptacle 28. The microcomputer system 90 delays for a predetermined interval until the flowable medium is completely discharged, whereupon it causes the lower plunger 30b to move to its extended position and then proceeds to the next routine. Thus, it becomes apparent that the premeasured quantity of flowable medium is a function of the distance between the upper and lower plungers 30a and 30b and the area of the discharge tube 22, as well as the time delay of the plungers 30a and 30b. While the distance between the slots 38a and 38b cannot be varied the area of the discharge tube 22 can be changed by employing a valve section 24b of a different diameter. It is also apparent that the discharge of the flowable medium is not dependent upon the head of the flowable medium in the hopper 18.

If the continuous stream mode is selected, both plungers 30a and 30b are moved from their extended positions to their commanded positions, which can be partially retracted or fully retracted. By partially retracting the plungers 30a and 30b, the diameter of the valve section 24b is reduced, thereby restricting the flow of the flowable medium through the discharge tube 22. Thus, flow can be regulated by the relative positions of the upper and lower plungers 30a and 30b. In this mode, the flow rate is a function of the head of the flowable medium in the hopper 18 and the open area of the valve section 24b. The dispensing of the flowable medium continues until the microcomputer system 90 receives an operator request to stop dispensing, whereupon it moves both plungers 30a and 30b to their extended positions and jumps to the next routine. If the request is not received, the microcomputer system 90 jumps to the next routine while leaving the plungers 30a and 30b in their commanded positions.

If the continuous pulse stream mode is selected, the flowable medium is dispensed in essentially the same manner as in the continuous stream mode, except that the plungers 30a and 30b are pulsed sequentially between their commanded positions and their fully retracted (open) positions. Thus, by alternately moving the upper and lower plungers 30a and 30b between their commanded positions and their fully retracted positions, large particles in the flowable medium which would otherwise clog the discharge tube 22 are allowed to pass therethrough. More particularly, a pulse delay is first set to determine the period during which the plungers 30a and 30b are held at their extended positions. Then, the plungers 30a and 30b are moved to their partially extended or partially retracted positions (i.e., their commanded positions). Once the pulse delay period elapses, the upper plunger 30a is moved to its fully retracted (open) position and then moved back to its partially extended position, whereupon the lower plunger 30b is moved to its fully retracted position and then moved back to its partially extended position. The next time this routine is entered, the cycle is repeated. This cycle continues until the microcomputer system 90 receives an operator request to stop dispensing, whereupon it moves both plungers 30a and 30b to their extended positions and jumps to the next routine If the request is not received, the microcomputer system 90 jumps to the next routine while leaving the plungers 30a and 30b in their partially extended positions. In addition to preventing solids from clogging the discharge tube 22, the pulsating plungers 30a and 30b reduce the discharge pressure, thereby minimizing the splattering of the flowable medium being discharged.

Next, the microcomputer system 90 performs the LOW LEVEL routine to determine the level of the flowable medium in the hopper 18 by detecting large, instantaneous fluctuations in temperature. As the flowable medium level recedes past the temperature sensor 78 (located at the low level mark), the temperature sensor 78 instantly goes from measuring the temperature of the flowable medium to the temperature of the air, which normally is at a much lower temperature than the temperature of the flowable medium. The resulting large instantaneous fluctuation in temperature results in low level detection. Implemented as such, the microcomputer system 90 reads the temperature from the temperature sensor 78, stores the reading as the current temperature and then compares the current temperature to a previous temperature reading. If the difference exceeds a predetermined threshold value indicative of a large, instantaneous fluctuation, the microcomputer system 90 illuminates the LOW LEVEL indicator lamp on the display panel/keypad 102. It then removes power to the heating element 76 and motor 85, and jumps to the next routine. If the threshold is not exceeded, the microcomputer system 90 stores the current temperature reading as the previous temperature reading and proceeds to the next routine.

Next, the microcomputer system 90 performs the HEAT routine. The microcomputer system 90 first examines the corresponding operator input If the operator did not command the heating element 76 on, the microcomputer system 90 skips to the next routine. If the heating element 76 was commanded on, the microcomputer system 90 compares the current temperature to a preset temperature value, typically 180 degrees. If the current temperature exceeds the preset value, indicating that the flowable medium has attained its desired serving temperature, the microcomputer system 90 turns off the heating element 76, resets the operator input, displays the current temperature, and jumps to the next routine. If the current temperature does not exceed the preset value, indicating that the flowable medium still needs to be heated, the heating element 76 is commanded on, the temperature is displayed, and the next routine is executed.

Finally, the microcomputer system 90 performs the MOTOR routine to service the motor 85. The microcomputer system 90 first examines the corresponding operator input. If the operator did not command the motor 85 to operate, the microcomputer system 90 returns to the INITIALIZATION routine. If the motor 85 was commanded on, the microcomputer system 90 determines the motor speed and actuates the motor 85. Thus, the rotating blades 68 of the heating/mixing assembly agitate the flowable medium solution in the hopper 18, causing a homogeneous mixture therein.

Once the microcomputer system 90 commands the motor on, it returns to the INITIALIZATION routine. The system control program is repeatedly executed until the soup dispenser 10 is turned off.

Figure 9:
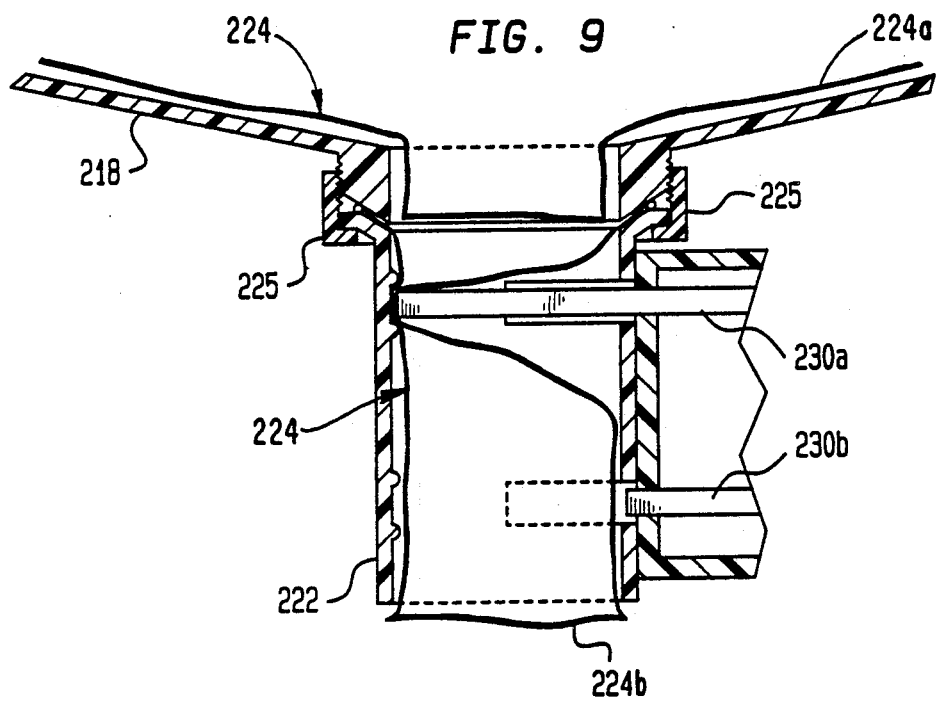
FIG. 9 is a detailed cross-sectional view of a hopper and disposable liner constructed in accordance with another exemplary embodiment of the present invention.
Figure 10:
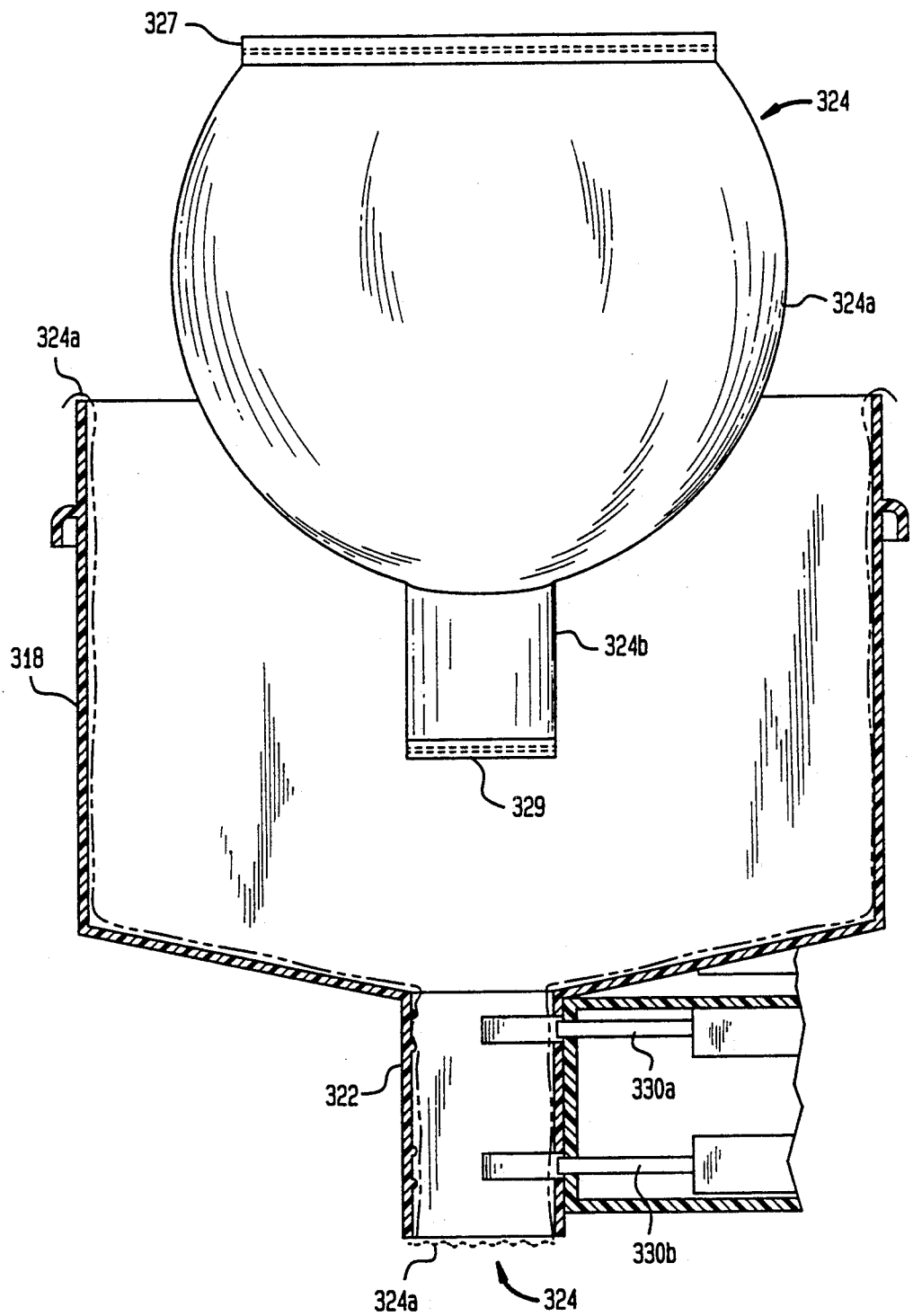
FIG. 10 is a detailed cross-sectional view of a hopper and disposable liner constructed in accordance with yet another exemplary embodiment of the present invention.

Two other exemplary embodiments of a soup dispenser constructed in accordance with the present invention are illustrated in FIGS. 9 and 10, respectively. Elements illustrated in FIGS. 9 and 10 which correspond to the elements described above with respect to the embodiment illustrated in FIGS. 1-8 have been designated by corresponding reference numerals increased by two hundred and three hundred, respectively The exemplary embodiments illustrated in FIGS. 9 and 10 operate in the same manner as the embodiment of FIGS. 1-8 unless otherwise stated.

Referring now to FIG. 9, there is shown an alternate embodiment of a hopper 218, discharge tube 222 and disposable liner 224. The disposable liner 224 includes two separate elements: a bag portion 224a which covers only the hopper 218, and a valve section 224b which covers only the discharge tube 222. To accommodate the separate elements of the disposable liner 224, the hopper 218 and the discharge tube 222 comprise separate pieces that are threadedly engaged by locking rings 225. Thus, to maintain sanitary conditions, the hopper 218 must be disassembled and cleaned periodically, and the disposable liner 224 must be replaced.

This embodiment conveniently allows for the diameter of the discharge tube 222 to be varied. As previously mentioned, the volume of flowable medium dispensed during the premeasured mode is a function of the distance between the plungers 230a and 230b and the diameter of the discharge tube 222, as well as the delay time of the plungers 230a and 230b. By inserting valve section 224b of different diameters into the discharge tube 222, the volume dispensed therefrom can be varied.

Referring now to FIG. 10, there is shown yet another embodiment of a disposable liner 324. The disposable liner 324 includes a bag 324a having a valve section 324b located below it for discharging flowable medium therefrom. The bag 324a matches the contour of the hopper 318, its top being sealed by a leakproof heat seal 327. The valve section 324b matches the contour of the discharge tube 322, its tip being sealed by a leakproof heat seal 329. The disposable liner 324 is made of a flexible material such as rubber. Thus, the disposable liner 324 can be adapted to store a flowable medium.

To insert the disposable liner 324 into the hopper 318, the plungers 330a and 330b are moved to their retracted positions. The bag 324a is inserted into the hopper 318 with the valve section 324b being inserted into and through the discharge tube 322. The top seal 327 is torn off or otherwise severed and the open upper end of the bag 324a is draped over the side of the hopper 318. The bag 324a can be secured to the hopper 318 by bands, clips or any other suitable means. The hopper 318 is then covered with the control head enclosure 14, which has the agitating/heating assembly 60 attached thereto Next, the plungers 330a and 330b are moved to their extended positions, thereby pinching the valve section 324b to prevent flowable medium from being discharged. Thereafter, the bottom seal 329 is torn or otherwise severed. Once the plungers 330a and 330b are retracted, the flowable medium can be discharged from the valve section 324b.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

We claim:

1. A method for dispensing a flowable medium, such as a liquid, a semi-liquid, or a liquid containing particulate matter, in preselected quantities and at preselected temperatures, using an apparatus which includes storing means for storing a flowable medium to be dispensed, dispensing means for dispensing the flowable medium from said storing means, and agitating means for agitating the flowable medium in said storing means to thereby enhance the dispensing of the flowable medium from said storing means, said agitating means including heating means for heating said agitating means and hence the flowable medium in said storing means and sensing means for sensing the temperature of the flowable medium in said storing means, said method comprising the step of detecting large instantaneous fluctuations in temperatures sensed by said sensing means to thereby provide an indication of the level of the flowable medium in said storing means.

2. A method according to claim 1, wherein said agitating means includes a plurality of rotatable blades which are made of a thermally conductive material, and wherein said heating means includes a heating element thermally connected to said blades, whereby said heating element heats said blades which, in turn, transfer the heat to the flowable medium in said storing means.

3. A method according to claim 2, wherein said sensing means is located in said storing means at a position indicative of a low level of the flowable medium.

4. A method according to claim 3, wherein a microcomputer system is used to detect large instantaneous fluctuations in temperatures sensed by said sensing means.

5. A method according to claim 4, wherein said microcomputer system controls the rotation of said blades of said agitating means.

6. A method according to claim 5, wherein said microcomputer system controls the amount of heat generated by said heating element.

7. A method according to claim 6, wherein the amount of the flowable medium dispensed from said storing means by said dispensing means is controlled by said microcomputer system.

8. Apparatus for dispensing a flowable medium, such as a liquid, a semi-liquid, or a liquid containing particulate matter, in preselected quantities and at preselected temperatures, comprising storing means for storing a flowable medium to be dispensed; dispensing means for dispensing the flowable medium from said storing means; agitating means for agitating the flowable medium in said storing means to thereby enhance the dispensing of the flowable medium from said storing means, said agitating means including heating means for heating said agitating means and hence the flowable medium in said storing means and sensing means for sensing the temperature of the flowable medium in said storing means; and detecting means for detecting large instantaneous fluctuations in temperatures sensed by said sensing means, said detecting means thereby cooperating with said sensing means to function as a level indicator for the flowable medium in said storing means.

9. Apparatus according to claim 8, wherein said agitating means includes a plurality of rotatable blades.

10. Apparatus according to claim 9, wherein said blades of said agitating means are made of a thermally conductive material, and wherein said heating means includes a heating element thermally connected to said blades, whereby said heating element heats said blades which, in turn, transfer the heat to the flowable medium in said storing means.

11. Apparatus according to claim 10, wherein said sensing means is located in said storing means at a position indicative of a low level of the flowable medium.

12. Apparatus according to claim 11, wherein said detecting means includes a microcomputer system.

13. Apparatus according to claim 12, wherein said microcomputer system controls the rotation of said blades of said agitating means.

14. Apparatus according to claim 13, wherein said microcomputer system controls the amount of heat generated by said heating element.

15. Apparatus according to claim 14, further comprising controlling means for controlling the amount of the flowable medium dispensed from said storing means by said dispensing means.

16. Apparatus according to claim 15, wherein said controlling means is controlled by said microcomputer system.

17. Apparatus for dispensing a flowable medium, such as a liquid, a semi-liquid, or a liquid containing particulate matter, comprising sorting means for storing a flowable medium to be dispensed; dispensing means for dispensing the flowable medium from said storing means; first regulating means for regulating the flow of the flowable medium into said dispensing means from said storing means, said first regulating means being movable between a first position in which said first regulating means prevents the flow of the flowable medium and a second position in which said first regulating means permits the flow of the flowable medium; second regulating means for regulating the flow of the flowable medium from said dispensing means, said second regulating means being movable between a first position in which said second regulating means prevents the flow of the flowable medium and a second position in which said second regulating means permits the flow of the flowable medium; and controlling means for controlling the operation of said first and second regulating means in at least two modes at operation, including a first mode of operating such that said second regulating means can be moved to its said second position when said first regulating means is in its said second position, whereby the flowable medium can flow continuously to and from said dispensing means, and a second mode of operation such that said first regulating means can be moved to its said second position while said second regulating means remains in its said first position, whereby the flowable medium can flow into said dispensing means from said storing means, and such that said second regulating means can be moved from its said first position to its said second position after said first regulating means is moved from tis said second position to its said first position, whereby the flowable medium contained in said dispensing means can be dispensed therefrom in a predetermined quantity independently of any head pressure created by the flowable medium sorted in said storing means.

18. Apparatus according to claim 17, wherein said controlling means includes a microcomputer system.

19. Apparatus according to claim 17, wherein the flowable medium is soup.

20. Apparatus according to claim 17, wherein said first regulating means is movable to a third position intermediate its said first and second positions and in which said first regulating means permits the flow of the flowable medium from said storing means to said dispensing means but at a flow rate less than that permitted when said first regulating means is in its said second position, and wherein said second regulating means is movable to a third position intermediate its said first and second positions and in which said second regulating means permits the flow of the flowable medium from said dispensing means but at a flow rate less than that permitted when said second regulating mean is in its said second position.

21. Apparatus according to claim 20, wherein said controlling means controls the operation of said first and second regulating means such that said first and second regulating means are moved to their said third positions substantially simultaneously, whereby the flowable medium can flow continuously to and from said dispensing means but at a rate less than that permitted when said first and second regulating means are in their said second positions.

22. Apparatus according to claim 21, wherein said controlling means controls the operation of said first and second regulating means such that said first regulating means is moved from its said third position to its said second position and then returned to its said third position while said second regulating means remains in its said third position, whereby the flowable medium can flow from said storing means to said dispensing means in a continuous pulsed manner which facilitates the passage of particulate matter contained in the flowable medium.

23. Apparatus according to claim 22, wherein said controlling means controls the operation of said first and second regulating means such that said second regulating means is moved from its said third position to its said second position and then returned to its said third position while said first regulating means remains in its said third position, whereby the flowable medium can flow from said dispensing means in a continuous pulsed manner which facilitates the passage of particulate matter contained in the flowable medium.

24. Apparatus according to claim 17, wherein said storing means includes a hopper removably positioned in a housing.

25. Apparatus according to claim 24, wherein said dispensing means includes a discharge tube depending from said hopper and communicating therewith, and wherein said storing means further includes a disposable liner having a first liner portion, which is removably received in said hopper, and a second liner portion, which is removably received in said discharge tube and which is formed monolithically with said first liner portion.

26. Apparatus according to claim 25, wherein said first and second liner portions are parts of a bag which is prepackaged with the flowable medium.

27. Apparatus according to claim 25, wherein said discharge tube is formed monolithically with said hopper.

28. Apparatus according to claim 24, wherein said storing means further includes a first disposable liner removably received in said hopper.

29. Apparatus according to claim 28, wherein said dispensing means includes a discharge tube depending from said hopper and communicating therewith.

30. Apparatus according to claim 29, wherein said dispensing means further includes a second disposable liner removably received in said discharge tube.

31. Apparatus according to claim 30, wherein said second disposable liner is formed separately from said first disposable liner.

32. Apparatus according to claim 31, wherein said discharge tube is formed separately from said hopper.

33. Apparatus according to claim 24, wherein said housing includes covering means for covering said hopper to thereby inhibit the contamination of the flowable medium contained therein.

34. Apparatus according to claim 33, wherein said controlling means includes a microcomputer system housed in said covering means.

35. Apparatus according to claim 34, wherein said covering means includes agitating means for agitating the flowable medium in said hopper, said agitating means extending into said hopper from said covering means.

36. Apparatus according to claim 35, wherein said agitating means includes a plurality of rotatable blades.

37. Apparatus according to claim 36, wherein said agitating means includes heating means for heating the flowable medium in said hopper.

38. Apparatus according to claim 37, wherein said blades are made of a thermally conductive material, and wherein said heating means includes a heating element thermally connected to said blades, whereby said heating element heats said blades which, in turn, transfer the heat to the flowable medium in said hopper.

39. Apparatus according to claim 37, wherein said agitating means includes sensing means for sensing the temperature of the flowable medium in said hopper.

40. Apparatus according to claim 39, further comprising detecting means for detecting large instantaneous fluctuations in temperatures sensed by said sensing means.

41. Apparatus according to claim 40, wherein said sensing means is located in said hopper at a position indicative of a low level of the flowable medium, and wherein said sensing means and said detecting means cooperate to function as a low level indicator.

42. Apparatus according to claim 41, wherein said microcomputer system functions as said detecting means.

43. A method for dispensing a flowable meidum, such as a liquid, a semi-liquid, or a liquid containing particulate matter, from a storage facility using apparatus which includes dispensing means for dispensing the flowable medium from said storage facility, first regulating means for regulating the flow of the flowable medium into said dispensing means from said storage facility, said first regulating means being movable between a first position in which said first regulating means prevents the flow of the flowable medium and a second position in which said first regulating means permits the flow of the flowable medium, and second regulating means for regulating the flow of the flowable medium from said dispensing means, said second regulating means being movable between a first position in which said second regulating means prevents the flow of the flowable medium and a second position in which said second regulating means permits the flow of the flowable medium, said method comprising the steps of controlling the operation of said first and second regulating means in at least two modes of operation, including a first mode of operation such that said second regulating means is moved to its said second position when said first regulating means is in its said second position, whereby the flowable medium can flow continuously to and from said dispensing means, and a second mode of operation such that said first regulating means is moved to its said second position while said second regulating means remains in its said first position, whereby the flowable medium can flow into said dispensing means from said storage facility, and such that said second regulating means is moved from its said first position to its said second position after said first regulating means is moved from its said second position to its said first position, whereby the flowable medium contained in said dispensing means can be dispensed therefrom in a predetermined quantity independently of any head pressure created by the flowable medium stored in said storage facility.

44. A method according to claim 43, wherein said first and second regulating means are controlled by a microcomputer system.

45. A method according to claim 43, wherein the flowable medium is prepackaged in a flexible bag-like receptacle adapted for insertion into said storage facility.

46. A method according to claim 45, wherein the flowable medium is soup.

47. A method according to claim 28, wherein said first regulating means is movable to a third position intermediate its said first and second positions and in which said first regulating means permits the flow of the flowable medium from said storage facility to said dispensing means but at a flow rate less than that permitted when said first regulating means is in its said second position, and wherein said second regulating means is movable to a third position intermediate its said first and second positions and in which said second regulating means permits the flow of the flowable medium from said dispensing means but at a flow rate less than that permitted when said second regulating means is in its said second position.

48. A method according to claim 47, wherein said first and second regulating means are controlled such that said first and second regulating means are moved to their said third positions substantially simultaneously, whereby the flowable medium can flow continuously to and from said dispensing means but at a rate less than that permitted when said first and second regulating means are in their said second positions.

49. A method according to claim 48, wherein said first and second regulating means are controlled such that said first regulating means is moved from its said third position to its said second position and then returned to its said third position while said second regulating means remains in its said third position, whereby the flowable medium can flow from said storage facility to said dispensing means in a continuous pulsed manner which facilitates the passage of particulate matter contained in the flowable medium.

50. A method according to claim 49, wherein said first and second regulating means are controlled such that said second regulating means is moved from its said third position to its said second position and then returned to its said third position while said first regulating means remains in its said third position, whereby the flowable medium can flow from said dispensing means in a continuous pulsed manner which facilitates the passage of particulate matter contained in the flowable medium.

* * * * *

UNITED STATES PATENT AND TRADEMARK OFFICE
CERTIFICATE OF CORRECTION

PATENT NO. : 4,993,593
DATED : February 19, 1991
INVENTOR(S) : Fabiano et al.

It is certified that error appears in the above-indentified patent and that said Letters Patent is hereby corrected as shown below:

<u>In the Claims</u>

Column 17, line 32, delete "sorting" and insert --storing--.
             line 68, delete "sorted" and insert --stored--.

Column 18, line 17, delete "mean" and insert --means--.

Column 19, line 50, delete "meidum" and insert --medium--.

Column 20, line 28, delete "28" and insert --43--.

Signed and Sealed this

Nineteenth Day of July, 1994

Attest:

BRUCE LEHMAN

Attesting Officer      Commissioner of Patents and Trademarks